Sept. 8, 1931.  G. E. SEIL  1,822,380
GAS PURIFICATION PROCESS AND APPARATUS
Filed May 7, 1926  2 Sheets-Sheet 1
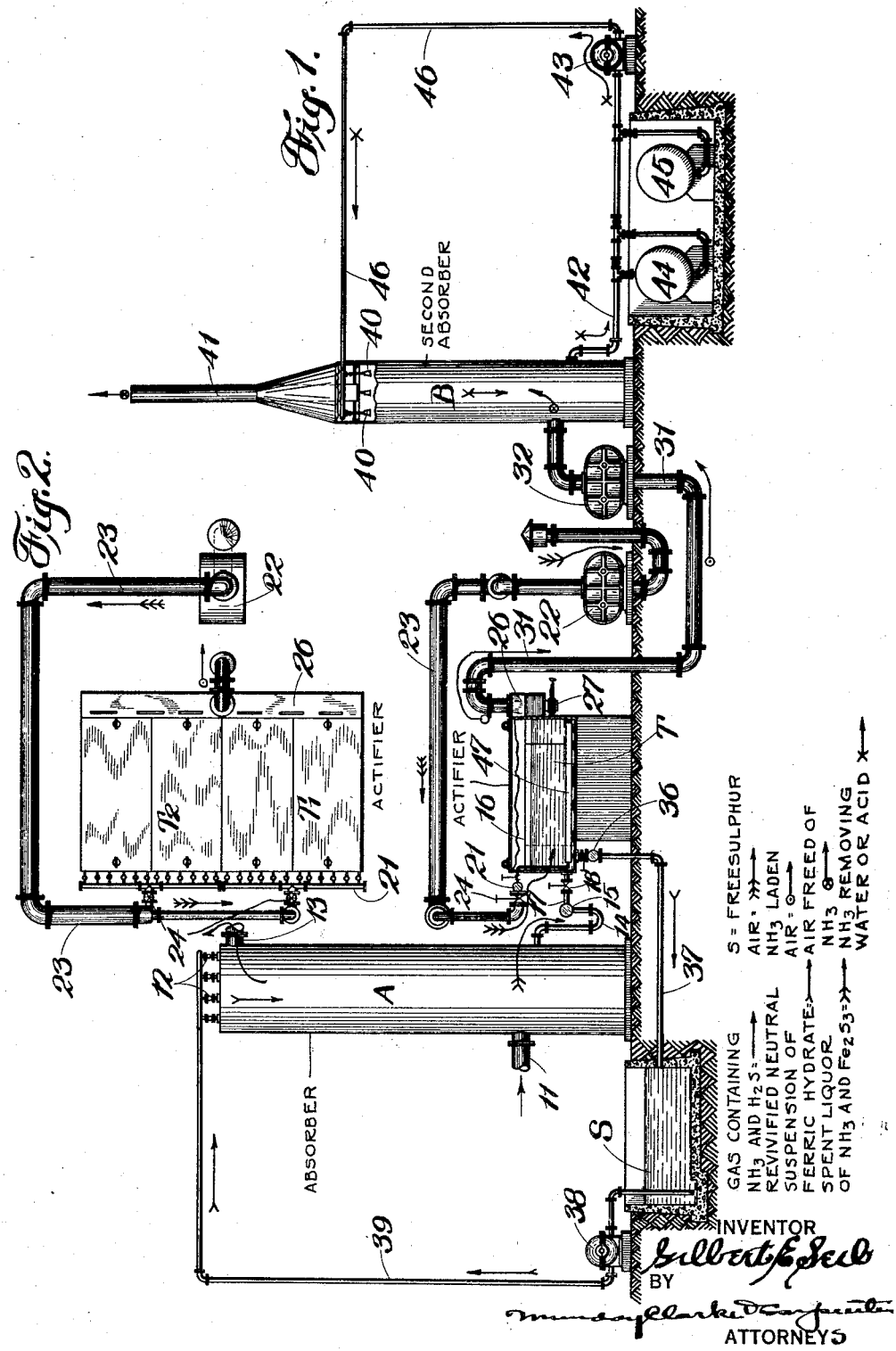

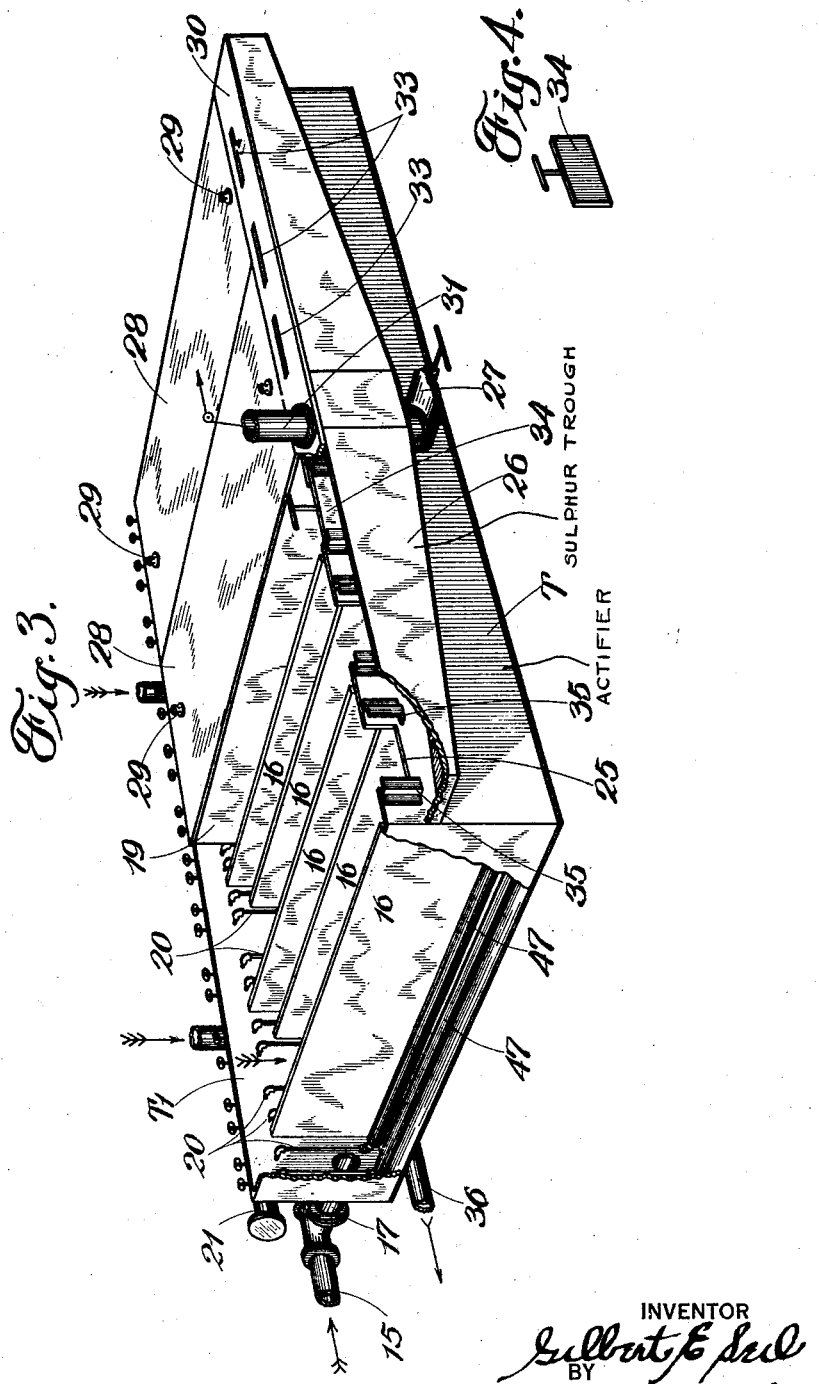

Patented Sept. 8, 1931

1,822,380

UNITED STATES PATENT OFFICE

GILBERT E. SEIL, OF NEWARK, NEW JERSEY, ASSIGNOR TO THE KOPPERS COMPANY, OF PITTSBURGH, PENNSYLVANIA, A CORPORATION OF PENNSYLVANIA

GAS PURIFICATION PROCESS AND APPARATUS

Application filed May 7, 1926. Serial No. 107,523.

This invention relates to process and apparatus for the treatment of gas, more particularly fuel gas, such as coal gas or other gas containing ammonia, for the purpose of purifying the said gas from hydrogen sulphide and/or other noxious impurities contained by the said gas. The objects of the invention include the use of ammonia, for instance, the ammonia contained by the gas, as an alkaline agent for effecting the said purification, and the liberation of the sulphur, originally present in the gas as hydrogen sulphide.

The invention further consists in such other new and useful improvements, and has for further objects such other operative advantages or results, as may be found to obtain in the process or apparatus hereinafter described or claimed.

In the copending application for United States Letters Patent of Frederick W. Sperr, Jr., Ser. No. 69,929, filed Nov. 18, 1925, there are described and claimed process and apparatus for purifying gas from hydrogen sulphide, wherein the ammonia contained by the gas, or other ammonia introduced to the same, serves as the alkaline agent wherein is suspended a ferric compound capable of converting hydrogen sulphide absorbed by the said agent into free sulphur when aerated; the said aeration revivifies the suspension for further use. In processes of this character, means must be provided for caring for the ammonia, which would ordinarily be liberated in the aeration stage. In said Sperr application, the ammonia absorbed by the neutral suspension of ferric compound in contact with the gas is removed by distillation, and the hot, substantially neutral, sulphided effluent is aerated with finely comminuted air, with resultant separation of free sulphur and revivification of the suspension, which is then cooled and returned to contact with unpurified gas.

The present invention provides means for utilizing the ammonia present in the gas as an alkali, without the necessity for distillation of the sulphided liquor after contact with the gas and prior to the aeration stage. According to the present invention, I introduce the alkaline sulphided liquors, after contact with the gas, directly into the aeration stage. The aeration is preferably conducted in a closed chamber, and the ammonia liberated by the action of the air used for aeration is subsequently recovered by suitable absorptive means. Notwithstanding the fact that my aeration apparatus is closed in such manner as to prevent the escape of ammonia or other gas of noxious character into the atmosphere, I have provided means for access to all parts thereof, as for example to the aeration media, that may be subject under actual conditions to stoppages or failure which necessitate removal and cleaning or replacement.

In the accompanying drawings forming a part of this specification and showing for purposes of exemplification certain form and manner in which the invention may be embodied and practiced but without limiting the claimed invention specifically to such illustrative instance or instances:

Figure 1 is an elevational view, parts being shown in section, of apparatus adapted to effect the removal of hydrogen sulphide from a gas containing ammonia, said apparatus including means for effecting absorption of the hydrogen sulphide and ammonia in a liquid, means for removing, aerating, and recirculating the said liquid, and means for disposing of the ammonia liberated in the course of aeration of the said liquid;

Fig. 2 is a top plan view of the aeration apparatus shown in Fig. 1;

Fig. 3 is a perspective sectional view of the said aeration apparatus, parts being broken away to give a clear view of certain details of said apparatus; and Fig. 4 is a perspective view of a stop or gate that is useful in the operation of the said aeration apparatus.

The same characters of reference designate the same parts in each of the several views of the drawings.

Referring more particularly to Fig. 1, gas containing ammonia enters the absorber A through the conduit 11. In the interior of the said absorber A means are provided for effecting contact between gas and liquid, as for example the combination of distributive and contact means described and claimed in copending application of Frederick W. Sperr, Jr., Ser. No. 21,980, filed April 9, 1925. A substantially neutral suspension of an iron compound, as for instance, a 1.0 per cent suspension of ferric hydrate, is introduced to the absorber A through the sprays 12, and travels downward through the absorber, coming into intimate contact with the rising gas. Ammonia present in the gas dissolves in the said liquid, rendering the same alkaline, and facilitating the absorption of hydrogen sulphide from the gas, which gas then leaves the absorber A through the conduit 13, substantially free from such noxious constituent. The absorptive liquid becomes sulphided through contact with the gas, and upon reaching the bottom of the absorber A, passes through the sealed outlet line 14 to the header 15, from which it is distributed into the compartments $T_1, T_2$, etc., of the aeration apparatus T, that is for convenience hereinafter designated as actifier T. The construction of said actifier is shown more clearly in Fig. 3. In the present instance, the actifier is comprised of two compartments $T_1$ and $T_2$, but a single compartment, or any number of compartments, may be employed, as may be convenient in accordance with the amounts of gas and/or liquid handled. Within each of the said compartments $T_1$, $T_2$, etc., are situate a plurality of baffles 16, so positioned as to cause the said compartment to be divided into a number of passes, through which the liquid passes, traversing each pass in opposite direction to its passage through the adjacent passes. The header 15 is preferably arranged so as to communicate through the valves 18 and pipes 17 to the compartments of the actifier, the liquid entering at similar corners of each compartment. Thus, the partition 19 between two compartments of the actifier T is adjacent to the last pass traversed by the liquid in one compartment, as for instance $T_1$, and is adjacent the first pass traversed in the adjacent compartment $T_2$. Ordinarily, the two compartments $T_1$, $T_2$ are operated in parallel, but by opening a passage in that part of the partition 19 which is adjacent to the inlet side of the actifier T, the compartments may be operated in series. Within each pass of the actifier, and parallel to and slightly above the bottom thereof are situate a plurality of vibratile tubular fabric aerators 47, such as those described and claimed in my copending application Ser. No. 21,978, filed April 9, 1925, which diffuse finely comminuted air into said liquid. Said aerators 47 are provided with air through the individual feeders 20, which in turn communicate with the air headers 21, of which there is one for each compartment of the actifier, and which are supplied with air from the blower 22 and air main 23. The air supply to each compartment may be shut off or regulated by turning one of the valves 24. The liquid in the actifier is maintained at a suitable depth of, say, three feet, and under the influence of the finely comminuted air introduced through the aerators 47, is rapidly and efficiently revivified, with separation of sulphur as free sulphur. The aeration is usually conducted in such manner as to cause the said sulphur to float upon the surface of the liquid; the maintenance of such a foam is beneficial in that it serves as an effective means of scrubbing the air leaving the surface of the liquid, and thereby removing any hydrogen sulphide and/or analogous noxious volatile impurity entrained by such air. The excess of foam is allowed to flow through the weirs 25 into the foam trough or launder 26 extending along the entire length of the actifier, and from which the sulphur foam or sludge may be removed through the valve 27 for further treatment as desired.

The air used for aeration of the sulphided ammoniacal liquid will carry with it as it leaves the surface of the said liquid, substantially all of the ammonia present. In order to prevent the escape of ammonia into the atmosphere about the actifier and to make possible the recovery of such ammonia, I have provided a covering or enclosing means for the actifier, and means for drawing off the ammonia-laden air, and I have so designed the said enclosure as to provide for easy access to the interior of the said actifier, when desired. Such means for access to the interior consists in part of the removable covers 28, of which there may be any convenient number for each compartment of the actifier. In the present illustrative embodiment of the invention, two are shown for each compartment, and as shown in Fig. 3, those which relate to the compartment $T_1$ have been removed and are not shown. For convenience in removing the said covers 28, I provide the lifting eyes 29, that are adapted to receive a hook suspended from a crane, or other lifting means.

For removing the ammonia-laden air, I make use of the foam trough or launder 26, which is integrally covered by means of the cover 30 (shown partly cut away in Fig. 3). Trough 26 is connected by means of conduit 31 with the intake side of the exhauster 32. The slots 33 are provided in the said cover 30 immediately above the weirs 25, to allow for the insertion of the stops or gates 34 that serve to shut off the flow through said weirs 25, when the gates 34 are inserted through the solts 33 to rest in the supports 35. The said gates 34 are useful when it is desired to gain access to one compartment of the actifier while others are in operation, as their insertion prevents any reduction of suction in the weirs of the other operating compartments.

The revivified liquid flows out at the bottom of the actifier and enters the header 36, flowing thence through the line 37 into the sump S. From the sump S, the liquid is pumped by pump 38 through line 39 and sprays 12 into the absorber A, thus recommencing the cycle of operation. Additions of fresh iron or other compound are made as necessary.

The ammonia-laden air leaving the actifier is conducted by the exhauster 32 through line 31 and enters the absorber B, that is filled with permeable contact means. Water or acid is introduced into the absorber B through the sprays 40, and comes into intimate contact with the rising ammonia-laden air, absorbing the ammonia present in the air. The air, freed of ammonia in this manner, escapes through the stack 41, while the ammoniacal solution leaves the absorber B through the line 42 to be recirculated back to absorber B by the pump 43 through line 46 and sprays 40, or to drain into the tank 44. Fresh water or acid or other absorbent may be added to the system from the tank 45. The saturated solution in tank 44 is withdrawn when desired for recovery of the ammonia. Such recovery may be accomplished by any of the well-known means which is suitable for the treatment of the ammonia in the form in which it has accumulated.

While I have described and illustrated my invention in a particular form and embodiment, I may modify the application thereof with respect to its several details. For example, I may vary the arrangement of aerators 47, baffles, and the like, within the actifier T, or I may employ other types of aerators 47, as for instance, Filtros plates, and the like. Or the ammonia-laden air may be otherwise removed from the said actifier T, and/or otherwise treated for recovery of the ammonia, as for instance in a saturator.

Moreover, I may vary the percentage of suspended compound in the primary absorbent liquid, and I may substitute for the said iron compounds other compounds of metals the sulphides of which are insoluble, such as compounds of nickel, cobalt and manganese. In case such, or other compounds, are shown to have a catalytic effect upon the reactions involved in the absorption of hydrogen sulphide, they may be used in far lesser quantities than those which are known to be reactive in effect.

The invention as hereinabove set forth is embodied in particular form and manner but may be variously embodied within the scope of the claims hereinafter made.

I claim:

1. A process of removing hydrogen sulphide from gas containing ammonia, consisting in: subjecting the said gas to contact with a wash liquor containing in suspension an iron compound, in such a manner as to cause the said wash liquor to absorb ammonia from the gas, thereby facilitating the removal of said hydrogen sulphide from the gas by the said iron compound; continuously removing the suspension and aerating the said ammoniacal liquid containing the sulphided iron compound out of contact with the gas to liberate free sulphur and drive off ammonia therein concurrently; returning the thereby revivified wash liquor containing the revivified iron compound to contact with fresh quantities of gas; and removing the ammonia liberated in the course of said aeration.

2. A process of removing hydrogen sulphide from gas containing ammonia, consisting in: subjecting the said gas to contact with a wash liquor containing in suspension an iron compound, in such a manner as to cause the said wash liquor to absorb ammonia from the gas, thereby facilitating the removal of said hydrogen sulphide from the gas by the said iron compound; continuously removing the suspension and aerating the said ammoniacal liquid containing the sulphided iron compound out of contact with the gas to liberate free sulphur and drive off ammonia therein concurrently; returning the thereby revivified liquid containing the revivified iron compound to contact with fresh quantities of gas; removing the air laden with ammonia during the course of aeration; and treating such air to recover ammonia therein.

3. In the purification of gas with an ammoniacal suspension of an iron compound the steps which consist in: aerating the ammoniacal sulphided suspension to liberate free sulphur and drive off ammonia therein concurrently and removing the ammonia liberated in the course of said aeration.

4. In the purification of gas with an ammoniacal suspension of an iron compound the steps which consist in: aerating the ammoniacal sulphided suspension to liberate free sulphur and drive off ammonia therein concurrently; removing the ammonia liberated in the course of said aeration; and recovering the ammonia.

5. In the purification of gas with an ammoniacal suspension of a metal compound which forms an insoluble sulphide capable of oxidation in aqueous suspension the steps which consist in: aerating the sulphided suspension to liberate free sulphur and drive off ammonia therein concurrently; confining the ammonia-laden air rising from the liquid; and treating such air to recover ammonia therefrom.

6. In the revivification of spent ammoniacal liquids used for gas purification purposes, the improvement which consists in aerating the said ammoniacal liquids in a closed system to prevent escape of ammonia therefrom into the atmosphere, drawing off from said closed system air containing ammonia, and subsequently removing the ammonia from said air.

7. The process of removing hydrogen sulphide from gas which also contains ammonia, consisting in: washing the gas with water containing in solution or suspension a metal compound which forms an insoluble sulphide capable of oxidation in aqueous suspension; continuously discharging and aerating such wash liquor after its contact with such gas and while containing both ammonia and the insoluble sulphide to liberate free sulphur and drive off ammonia therein concurrently; washing such air, after it has passed through such spent wash liquor, to absorb the ammonia from such air; and returning the ammonia free gas washing liquor containing the regenerated metal compound for further contact with gas.

8. The process of removing hydrogen sulphide from gas which also contains ammonia, consisting in: washing the gas with a wash liquor containing a compound of a metal whose sulphide is insoluble, to remove ammonia and hydrogen sulphide from the gas; aerating such spent wash liquor after its contact with such gas and while containing both ammonia and the insoluble sulphide to liberate free sulphur and drive off ammonia therein concurrently; removing ammonia from aerating air and freeing the liquor of free sulphur and returning the aerated wash liquor containing such compound, free of ammonia and free sulphur, for further contact with gas.

9. A process as claimed in claim 7 and in which the aeration is effected with finely comminuted air.

10. A process as claimed in claim 8 and in which the aeration is effected with finely comminuted air.

11. A process of removing hydrogen sulphide from gas containing it and also containing ammonia, consisting in: washing such gas with a wash liquor and thereby removing ammonia from the gas and forming an ammoniacal liquor which absorbs hydrogen sulphide from the same gas; continuously discharging the wash liquor and aerating such wash liquor while containing absorbed ammonia and a compound of a metal which forms an insoluble sulphide so as to liberate the sulphur of such hydrogen sulphide as free sulphur and drive off ammonia therein concurrently; recovering ammonia from such aerating air; and returning the aerated wash liquor, free of ammonia and free sulphur, to wash further gas.

12. A process as claimed in claim 11 and in which the washing of the gas and the aeration of the wash liquor is effected while a compound of a metal whose sulphide is insoluble is present in the wash liquor, and in which the aeration is effected with finely comminuted air.

13. In a process for purifying gases of hydrogen sulphide involving the use of ammonia as the alkali and involving the use of a metallic compound which effects liberation of sulphur as free sulphur during aeration of spent wash liquor, the improvement consisting in the steps of concurrently liberating the sulphur as free sulphur and driving off the ammonia in the spent liquor by aerating the spent liquor while the ammonia and sulphide are both contained in the spent liquor and absorbing free ammonia from the aerating air.

14. In a process for purifying gases of hydrogen sulphide involving the use of ammonia as the alkali and involving the use of a metallic compound which effects liberation of sulphur as free sulphur during aeration of spent wash liquor, the improvement consisting in the steps of concurrently liberating the sulphur as free sulphur and driving off the ammonia in the spent liquor by aerating the spent liquor while the ammonia and sulphide are both contained in the spent liquor and washing the air to remove ammonia therefrom.

15. In a process for purifying gases of hydrogen sulphide involving the use of ammonia as the alkali and involving the use of a metallic compound which effects liberation of sulphur as free sulphur during aeration of spent wash liquor, the improvement consisting in the steps of concurrently liberating the sulphur as free sulphur and driving off the ammonia in the spent liquor by aerating the spent liquor while the ammonia and sulphide are both contained in the spent liquor and washing the air with an acid to remove the ammonia from the air.

16. In a process for purifying gases of hydrogen sulphide involving the use of ammonia as the alkali and involving the use of a metallic compound which effects liberation of sulphur as free sulphur during aeration of spent wash liquor, the improvement consisting in the steps of concurrently liberating the sulphur as free sulphur and driving off the ammonia in the spent liquor by aerating the spent liquor while the ammonia and sulphide are both contained in the spent liquor and washing the air with a circulating wash liquor to remove the ammonia from the air, said wash liquor containing ammonia previously washed from the air.

17. The process of removing hydrogen sulphide from a gas containing ammonia which comprises: subjecting the gas to contact with a cool and substantially neutral suspension of a metallic compound, capable of absorbing ammonia and hydrogen sulphide from the gas, removing the suspension and aerating it to liberate free sulphur and to drive off the ammonia therein, and returning the substantially neutral suspension to contact with gas.

18. Apparatus for purifying gases comprising, in combination: an absorber; gas inlet and outlet means therefor; an actifier tank for said absorber adapted for containing a body of liquid therein; means for maintaining a circulation of liquid back and forth between said absorber and said actifier; said means being adapted to deliver liquid from the absorber to the actifier at the lower part thereof; means for forcing gas into a body of liquid in said actifier tank at the lower part thereof; means for collecting and removing solids from a body of liquid in said actifier tank at the upper part thereof; a second absorber for gas from said actifier; and enclosed means for conducting gas from the upper part of said actifier tank to said second absorber.

19. Apparatus as claimed in claim 18 and including enclosed means for recirculation of washing liquor through said second absorber.

20. Apparatus for purifying gases with washing liquid and for actifying said liquid comprising, in combination: an absorber; an actifier tank; means for circulation of liquid to and fro between said absorber and said tank; a trough for said tank and in communication therewith nearer the upper than the lower limits thereof; a cover for said tank for sealing it from the atmosphere; and a conduit for confining and leading gases from said trough.

21. Apparatus for purifying gases comprising, in combination: an absorber; on actifier comprising a plurality of compartments; means for circulation of liquid to and fro between said absorber and actifier; removable covering means for each of said compartments and each adapted for sealing their respective compartments; a trough common to a plurality of said compartments; a cover for sealing said trough; inlet means respectively below said cover and said covering means for leading material from each of said compartments, respectively, into said trough; inlet closure means for shutting off each of said inlets from said trough during removal of the covers from their respective compartments and a conduit for confining and leading gases from said trough.

22. Apparatus for purifying gases comprising, in combination: an absorber; an actifier comprising a plurality of compartments; means for circulation of liquid to and fro between said absorber and actifier; removable covering means for each of said compartments and each adapted for sealing their respective compartments; a trough common to a plurality of said compartments; a cover for sealing said trough; inlet means respectively below said cover and said covering means for leading material from each of said compartments, respectively, into said trough; gas offtake means communicating with said trough; and inlet closure means respectively movable through the cover for said trough for shutting off each of said inlets from said trough during removal of the covers from their respective compartments.

In testimony whereof I have hereunto set my hand.

GILBERT E. SEIL.